(12) United States Patent
Keesmaat et al.

(10) Patent No.: US 7,760,714 B2
(45) Date of Patent: Jul. 20, 2010

(54) SYSTEM AND METHOD FOR CONTROLLING A TELECOM NETWORK

(75) Inventors: Nicolaas Wijnand Keesmaat, Voorburg (NL); Dirk Los, Leiden (NL)

(73) Assignee: Koninklijke KPN N.V., The Hague (NL)

( * ) Notice: Subject to any disclaimer, the term of this patent is extended or adjusted under 35 U.S.C. 154(b) by 902 days.

(21) Appl. No.: 10/521,058

(22) PCT Filed: Jul. 18, 2003

(86) PCT No.: PCT/EP03/07858

§ 371 (c)(1), (2), (4) Date: Dec. 23, 2004

(87) PCT Pub. No.: WO2004/014088

PCT Pub. Date: Feb. 12, 2004

(65) Prior Publication Data

US 2005/0226177 A1   Oct. 13, 2005

(30) Foreign Application Priority Data

Jul. 24, 2002   (EP) .................................. 02078028

(51) Int. Cl.
*H04L 12/50* (2006.01)
(52) U.S. Cl. .................. 370/360; 370/401; 379/272
(58) Field of Classification Search ................ 370/351, 370/356, 338, 236, 282, 285, 355, 360, 373, 370/384, 395.2, 401, 402; 709/226, 223, 709/204, 205, 229–232; 379/271, 272
See application file for complete search history.

(56) References Cited

U.S. PATENT DOCUMENTS

| | | | |
|---|---|---|---|
| 5,432,907 A * | 7/1995 | Picazo et al. ................. | 709/249 |
| 5,841,854 A | 11/1998 | Schumacher et al. | |
| 5,862,208 A | 1/1999 | McLampy et al. | |
| 5,978,379 A * | 11/1999 | Chan et al. .................. | 370/403 |
| 6,097,804 A | 8/2000 | Gilbert et al. | |
| 6,337,858 B1 | 1/2002 | Petty et al. | |
| 6,377,571 B1 * | 4/2002 | Tai .............................. | 370/355 |
| 6,442,169 B1 * | 8/2002 | Lewis .......................... | 370/401 |
| 6,963,556 B1 * | 11/2005 | Goldman et al. ............ | 370/401 |
| 2001/0055308 A1 * | 12/2001 | Afrakhteh et al. ........... | 370/401 |
| 2002/0057777 A1 | 5/2002 | Saito et al. | |
| 2002/0172209 A1 * | 11/2002 | Ohta et al. ................... | 370/401 |

\* cited by examiner

*Primary Examiner*—Kwang B Yao
*Assistant Examiner*—Jeffrey M Rutkowski
(74) *Attorney, Agent, or Firm*—McDonnell Boehnen Hulbert & Berghoff LLP

(57) ABSTRACT

A system for controlling a telecommunications network, e.g., a public switched switching network, which has a first switch fabric, for controlling connections or calls in the network. This fabric has first and second ports, and third ports for communicating with, e.g., a second switch fabric and/or peripheral apparatus. A bridging circuit, also located within the network, may be connected between the first and second ports. A computer apparatus, external to the network, is connected to the first and the second ports of the first switch fabric in order to control connections among the first, second and third ports.

20 Claims, 3 Drawing Sheets

SYSTEM AND METHOD FOR CONTROLLING A TELECOM NETWORK

FIELD OF THE INVENTION

The invention relates to a system and method for controlling a telecommunication network.

BACKGROUND

It is known that a telecommunication network is operated by interconnected switches. An example of such a network is the Public Switched Telecommunications Network (PSTN). This network may be combined with a radio telecommunications network for mobile communication.

The switches route calls from one subscriber to another, by passing control data and voice data along circuits, which are the interconnecting links among the switches in the network.

A subscriber may be connected to the network via a network access point using a peripheral apparatus, such as a telephone, a modem, an answering device, IVR equipment, conference call hardware or any apparatus used for communication via or interfacing with the network. Likewise, a voice service such as teleconferencing, news, weather forecast, traffic announcements or any other service may be connected to the network via a network access point also using a peripheral apparatus. A peripheral apparatus may originate connections or calls or receive them and has control circuitry to control these calls.

Similarly, each switch has its own control circuitry for connecting a call to another switch. The control circuitry implements rules telling the switch what to do with an incoming call. A call is originated by communicating a control signal from a peripheral apparatus to a switch and a peripheral apparatus receives a call by receiving control signals from a switch. Upon acceptance of the control signals, a voice connection is established between the switch and the peripheral apparatus via a voice-only circuit.

Once a call is received by one switch, whereby the call is accompanied with control data, the switch will on the basis of that control data route the call to a next switch or to another peripheral apparatus or service, whereby voice-only circuits are used to carry the voice data.

The path through the network from a peripheral apparatus to a particular switch may be referred to as one leg of a call or a half call. The path from that switch to another peripheral apparatus may be referred to as the other leg of the call or other half call.

In some cases, simple routing or switching is not enough. It may be desirable that a call is connected to a service, e.g., an information service. In other cases, more complex switching is required, e.g., in the case of call forwarding where a subscriber has moved to another number.

"IN" (Intelligent Networking) was introduced to perform such services. Switches connected to IN systems detect calls which require special treatment. The control signals of such calls are diverted to the IN system where decisions are made on the further treatment of the call. The result of these decisions is communicated to the switch, which will treat each such call accordingly.

Nowadays, there is a need for call control from a different perspective. With the emerging of computer networks, Internet, LANs and WANs, a need arises to be able to control telecom connections from the computer environments. IN provides for such possibilities. It is now possible to initiate a call or service from a computer network which is connected to an IN system, which is, in turn, connected to a switch and thereby able to establish calls, whereby the two legs of the call have their starting point at the switch connected or controlled by the IN system.

IN systems however are expensive and are limited in their functionality. They are bound by telecom standards, which evolve slower than the information technology now available.

The U.S. Pat. No. 6,337,858 discloses a further development, whereby a switch fabric is used outside of the telecom network. This switching fabric, comprising switch and switch control means is connected to and controlled by computer telephony hardware. This architecture is referred to as computer telephony integration (CTI) hardware. In this architecture, it is possible to set up a first call from the switching fabric to a first peripheral apparatus and a second call from the switching fabric to a second peripheral apparatus. Both calls constitute a leg to the respective peripheral apparatuses. After the legs have been set up, the CTI than bridges the calls.

This architecture gives control over both legs of the call. The result is great flexibility of building calls from the CTI environment. The CTI may be part of the Internet, a LAN or a WAN. Thereby, all kinds of users may be enabled to create telecom services in relation to, for example, a Web based service.

Despite the advantages of the solution disclosed in U.S. Pat. No. 6,337,858, a switch fabric outside of the telecommunication network is required. Switches are expensive equipment.

SUMMARY OF THE INVENTION

It is therefore a first object of the invention to provide a system for controlling a telephony network, to control at least two call legs, which are bridged within the telecom network using conventional switches.

It is a further object to provide a method for controlling a telephony network, for controlling at least two call legs within the telephony network using conventional control commands.

This first object of the invention can be achieved by a system for controlling a telephony network, for example a PSTN network which comprises switch apparatus, which may be present in the telephony network. The switch apparatus may have ports, used for connecting to further switch fabric or peripheral apparatus in the telecom network. Each port can have a control section and a voice data section. The switch apparatus may be arranged to receive control commands via the control sections of the ports for controlling connections or calls between the ports. A bridging circuit may be connected between the voice data sections of a first port and a second port. At least one third port being connected to the telecom network may be present. The system may further comprise a computer apparatus for communicating with the switch apparatus, arranged to send a first control command to the control section of the first port of the switch apparatus. The computer apparatus may also be arranged to send a second control command to the control section of the second port of the switch apparatus.

The connection from the at least third port to a peripheral apparatus may be completed according to normal call completion, by propagating appropriate control signals and subsequent switching in intermediate further switch fabric between the at least third port and the peripheral apparatus.

In this manner, a connection may be controlled between a first peripheral apparatus and a second peripheral apparatus via two independent connections, which are bridged via the bridging circuit. This provides the freedom of control necessary to provide services to subscribers where on-the-fly and seamless connections between subscribers may be altered, rerouted, re-rated and many other possibilities while using standard switch apparatus and where no IN system is required.

In an embodiment of the invention where the computer apparatus may be arranged to receive control signals from the switch apparatus, it is advantageous to start a particular service on the receipt of a control command.

The control commands are routed to the computer apparatus by the switch apparatus. The service may comprise the control of another half call, which may be bridged by the voice-only circuit.

In a further embodiment, where the computer apparatus may comprise a server, connected via a computer network, where the server is arranged to communicate with the switch apparatus and to perform a service upon receipt of a command from the user terminal, it is particularly advantageous to initiate services from a user terminal. The user terminal may be connected to the computer apparatus via the Internet. Users may initiate a telecom service while using the Internet or any other computer network.

In a further embodiment of the invention, where the computer apparatus may comprise a signalling gateway, that may be arranged to communicate with the server via a communications link or the computer network, and the signalling gateway may comprise a first and a second communication port that communicate with the control section of the first and second port respectively of the switch apparatus, it is advantageous that the further computer apparatus, the server and user terminals need not directly interface to the switch apparatus. This is achieved by commercially available signalling gateway, which is arranged to communicate with switch apparatus and may be controlled by simple commands, also known as events.

In a further embodiment, wherein the switch may comprise one switch, having the first and second ports with the bridging circuit between the voice data sections of the two ports and at least one third port connected to the telecom network, it is particularly advantageous to utilize two free ports on a switch already available in the telecom network. Even if such ports are not available, it is a standard routine procedure to add extra ports to a conventional switch, thereby making it very simple and cheap to add the functionality of setting up connections as described in the first object of the invention.

In a further embodiment of the invention, where the switch apparatus may comprise at least two switches, having the bridging circuit between the voice data sections of one port of one switch and one port of a second switch, and the at least two switches are connected to the telecom network via at least one port on each switch, it is advantageous to have the possibility to use an existing voice-only circuit as a bridging circuit between two switches to install the functionality of setting up connections as described in the first object of the invention. This may be necessary if spare ports are not available or possible in one switch.

The further object of the invention can be achieved by a method, where a computer apparatus may be arranged to communicate with the control sections of a first and second ports of a switch apparatus. The method may comprise the steps of controlling a first connection between a first circuit of the first port with a first peripheral apparatus accessible via at least one third port of the switch apparatus, and may further comprise the step of controlling a connection between a second circuit of the second port with a second peripheral apparatus accessible via at least one third port of the switch apparatus, whereby the first and second ports are connected via a bridging circuit and the first and second circuits are matched.

This is particularly advantageous, since standard control methods may be used to control the switch apparatus, so no special switch outside the telecom network is necessary, to control a connection which is made up of two independent connections, that are bridged via the bridging circuit.

In an embodiment of the invention, where the computer apparatus may comprise a server and at least one user terminal, connected via a network, and the server may be arranged to communicate with the switch apparatus, the method may have the steps of the server performing a first service upon receipt of a command from a user terminal, and the service has the steps of communicating control commands to the switch apparatus, advantageously the switch apparatus may be controlled by a issuing a command from a user terminal, i.e., while using the Internet or any other computer network. Various kinds of services may be conceived using the Web as a starting point for all kinds of telecom services using the telecom network.

In a further embodiment of the invention, where the computer apparatus may be arranged to receive control messages from the switch apparatus, the method may comprise the steps of the server performing a second service upon receipt of a command from the switch apparatus, the service comprising the steps of communicating control commands to the switch apparatus, the invention has the advantage of being able to define services initiated by telecom network events without having to adapt the telecom network itself. Only relatively inexpensive computer apparatus is needed to perform such services and which may be developed on a platform appropriate for a server, user terminal and network environment.

In a further embodiment of the invention, where the computer apparatus may further comprise a signalling gateway, the method further comprising the steps of generating an event in the server, the server communicating the event to the signalling gateway, the signalling gateway translating the event in a control command, the signalling gateway communicating the control command to the switch apparatus via the control section of the first or third port, it is advantageous to generate simple telecom events in the server which are translated by a commercially available signalling gateway, e.g., a Milborne.

The invention may be embodied using the elements described in this document in various combinations.

BRIEF DESCRIPTION OF THE DRAWINGS

The invention is explained according the figures summarized as below.

DETAILED DESCRIPTION

Figure 1:
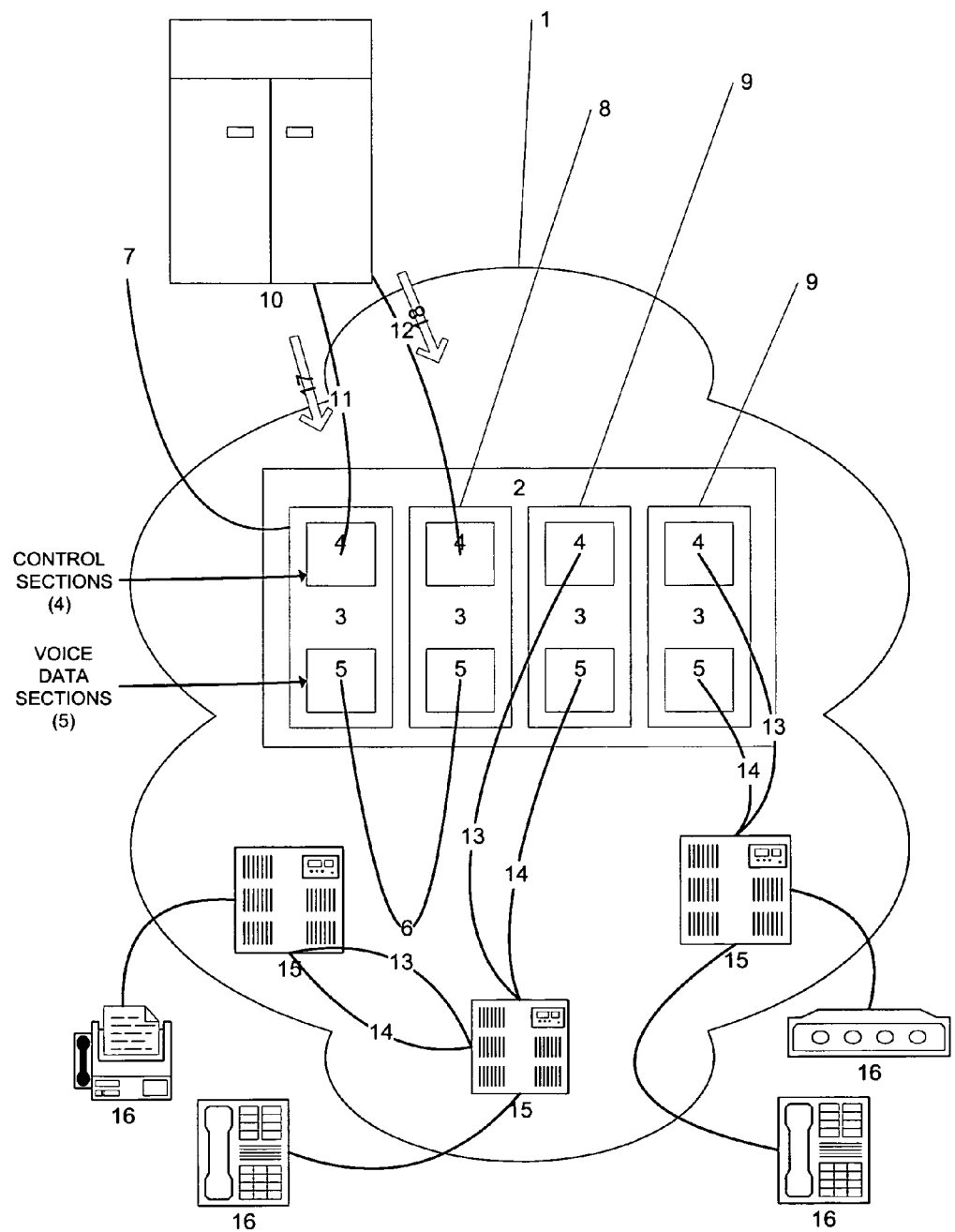
FIG. 1 shows an embodiment according to the invention.

FIG. 1 shows a telecommunication network 1 including a first switch fabric 2 and further switch fabric 15.

The telecom network 1 basically represents a PSTN network, but any telecom network having switches, including soft switches may apply. The network 1 may also include switch fabric and radio base stations for mobile telecommunication services like GSM or any other way of mobile telecommunication. Furthermore, the network 1 may also include voice gateways acting as switching interfaces between a telecom network and for example an IP network (Voice-Over-IP).

The first switch fabric 2 for switching calls or connections has communication ports 3 for communicating among the further switch fabric 15 or with peripheral apparatuses 16. The ports 3 communicate having a control section 4 and a voice data section 5. The control sections 4 are used for passing connection control data; the voice data sections 5 are used for passing the voice data. The control and voice data sections may include separate electrical connectors for connecting a cable, but they may also be combined in a single connector. In another embodiment, the control and voice data sections 4, 5 may share the same connection. This is, for instance, the case where peripheral apparatuses 16 are connected with switch fabric, using one pair of conductors only, and where control and voice data share the same connection.

The peripheral apparatuses 16 may be any equipment used by end users or used for interfacing voice or data sources with the network, such as telephones, fax, modems and the like.

According to the invention, two ports 7,8 of ports 3 are reserved, whereby a bridging circuit 6 connects the voice data sections 5, which is a common way of connecting the voice part of calls or voice connections from one switch to another. The control sections 4 of the ports 7,8 however are connected to a computer apparatus 10 by means of control links 11 and 12.

The computer apparatus 10 is capable of communicating with the ports 7 and 8 of the first switch fabric 2, and thereby controlling calls or connections made via those ports 7 and 8.

These ports 7, 8 may be instructed using control commands by the computer apparatus 10 to establish or terminate or any other form of control of connections or calls which may pass through the ports 7 or 8.

The computer apparatus 10 may for example issue a first command 17 telling the first switch fabric 2 to establish a first connection or half call between the voice data section 5 of port 7 and a peripheral apparatus 16 via one of third ports 9 of ports 3. The first switch fabric 2 and the further switch fabric 15 make the connection using circuits 14 and control links 13. Circuits 14 may be combined in a trunk.

Control links 11, 12 and 13 may be combined in a control network. A C7 control network is an example of such a network, whereby switches in a telecom network exchange their control signals or commands via a common control network. A control link thus may be a virtual link defining a communication channel from one point in the control network to another.

A circuit 14 and a control link 13 are connected to the voice data section 5 and the control section 4 respectively of the at least one third port 9 on the first switch fabric 2. On the further switch fabric 15, the circuit 14 and control link 13 are connected to corresponding control and data sections 4,5 of further ports 3.

The computer apparatus 10 may also issue a second command 18 controlling the first switch fabric 2 to establish a second connection or half call between the voice data section 5 of port 8 and a peripheral apparatus 16 via one of third ports 9.

The two half calls are than bridged by the bridging circuit 6. So a first subscriber may receive a call ultimately via port 7, a second subscriber may receive a call via port 8. Since both half calls are bridged via bridging circuit 6 both subscribers may communicate with each other.

The computer apparatus 10 may also issue commands for terminating the connections or half calls established via the ports 7 or 8 using the first switch fabric 2. Thus it is possible to disconnect one of the subscribers, e.g., the second subscriber, establish a new half call to a third subscriber, such that the first subscriber can now communicate with the third subscriber, without the first subscriber having to disconnect.

The commands issued or received by the computer apparatus may comprise various C7 signalling protocols (such as MTP Layers 1-3, ISUP, SCCP, TCAP, INAP, MAP or SMS). The control links 11 and 12 and the control links 13 may be C7 links or any connection type used for communicating control signals or commands between switches. For commonly used switches, very often ISUP protocols apply.

In this manner, the object of the invention is achieved. It is now possible to flexibly bridge and independently establish half calls or connections under computer control, using standard switches. So modern services, through which subscribers are dynamically connected, can be developed and implemented in any existing telecommunications network.

A voice section 5 of a port 3 may be known by its CIC (Circuit Identification Code). A bridging circuit 6 or a circuit 14 connected to a voice sections 5 of two of ports 3. The circuits may be realized in the form of fibers or wires in a cable, but also as multiplexed circuits whereby voice data is sent over a single communication line, e.g., a glass fiber. A circuit 14 may also be part of a wireless connection.

Using circuits, the first switch fabric 2 may be instructed by the computer apparatus 10 to control a first call between a circuit in the voice-data section 5 of a port 3, e.g., port 7, and another circuit in the voice data section 5 of another third port 3, e.g., one of ports 9.

A second half call may then be controlled between a circuit in the voice-data section 5 of a second port 3, e.g., port 8, and yet another circuit in the voice data section 5 of another third port 3, e.g., one of ports 9. A bridging circuit 6, bridges the voice data sections 5 of ports 7 and 8.

In a further embodiment according to the invention, the computer apparatus 10 may also be arranged to receive incoming control commands from the first switch fabric 2. The commands may be detected and used for starting a particular behavior as part of a service for the subscriber that initiated the call that was switched to, e.g., port 7 of the first switch fabric 2.

Examples of services using command detection are:

smart call forwarding (at busy, at no-reply), whereby a first half call is established from a first peripheral apparatus 16 towards the first switch fabric 2, a second half call is established from the first switch fabric 2 towards a second peripheral apparatus 16 as requested by the user of the first peripheral apparatus 16, and whereby a new half call is established from the first switch fabric 2 towards a third peripheral apparatus 16 on busy or non-completion of the half call towards the second peripheral apparatus 16.

completion of a call after operator contact ("information"), whereby a first half call is established from a first peripheral apparatus 16 towards the first switch fabric 2, a second half call is established from the first switch fabric 2 towards a second peripheral apparatus 16 associated with a telephone operator, the telephone operator being able to establish a third half call from the first switch fabric 2 towards a subscriber at a third peripheral apparatus 16.

call conferencing with the possibility to have a private conversation. In this example, a subscriber using his peripheral apparatus 16 may be connected to the first switch fabric 2 first, the control part of the call being intercepted by the computer apparatus, thus establishing a first half call, a second half call then established by the computer apparatus 10 from the first switch fabric 2 to a first conference call hardware as another peripheral apparatus 16. The bridging circuit 6 bridges both half calls. More subscribers may be connected to the conference call hardware in a similar manner. During the conference call, two or more participants may decide to temporarily disconnect their half call from the first switch fabric 2 to the first conference call hardware and establish a second half call from the first switch fabric 2 to a second conference call hardware, by sending a control command, e.g., by pressing a button on their phone. This command is then again intercepted by the computer apparatus 10 which disconnects the second half call from the first switch fabric 2 to the first conference call hardware and establishes a third half call from the first switch fabric 2 to the second conference call hardware, whereby the first half call and third half call are again bridged by the bridging circuit 6.

In a further embodiment according to the invention, the computer apparatus 10 may also be arranged to receive control commands on one control port connected to the first switch fabric 2 and pass them to a second control, also connected to the first switch fabric 2 to allow the normal passage of control commands from one port to another.

The computer apparatus 10 may detect if an incoming control command represents a request for a particular service. If not, the control command may be passed on to the second control port. For these control commands, the computer apparatus behaves transparently.

In a preferred embodiment according to the invention, the first switch fabric 2 comprises one switch that has the first, second and the at least one third ports (7,8 and 9). The invention may be realized this way for example by using spare ports 3 in a switch, which is already in place in the telecom network 1. The telecom network 1 may also be expanded, adding a switch and configuring it according to the invention.

Network administration is simple, since only a single location of the switch is involved.

Figure 2:
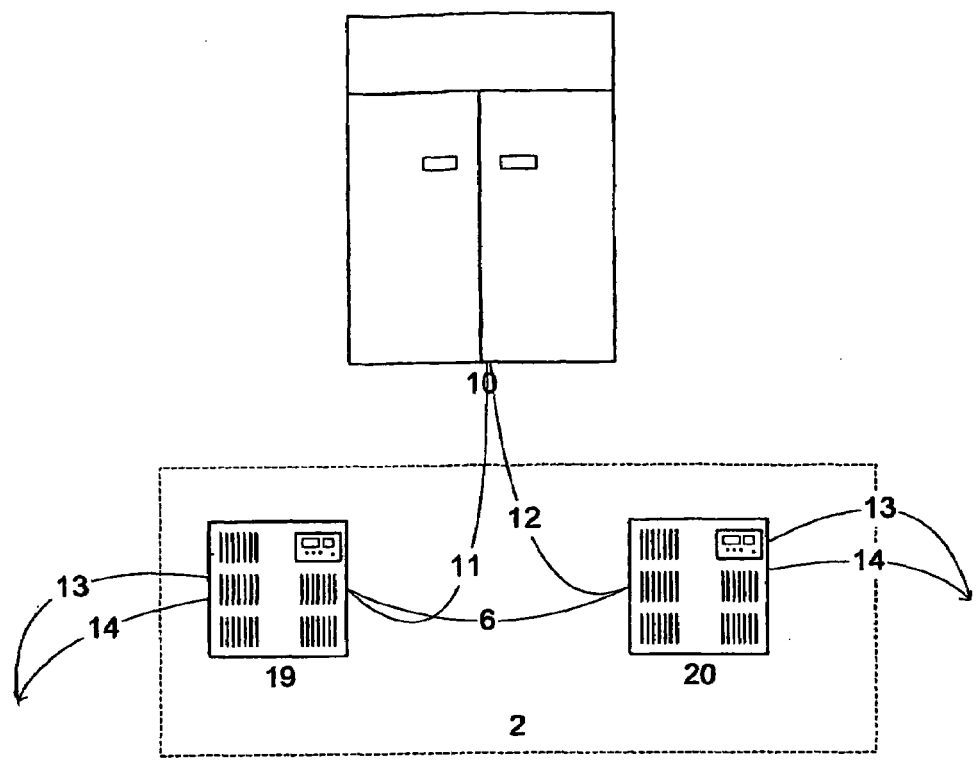
FIG. 2 shows an embodiment of the switch apparatus according to the invention.

FIG. 2 shows an embodiment of the first switch fabric 2 according to the invention.

In this embodiment a circuit connects a first port 7 (not specifically shown) at a first switch 19 to a second port 8 (not specifically shown) at a second switch 20 thereby forming the bridging circuit 6. The corresponding control links of ports 7 and 8 communicate with the control ports of the computer apparatus 10, thus establishing the first control link 11 and the second control link 12 by which the computer apparatus 10 controls the first switch fabric 2 as described.

This configuration allows for situations where spare circuits between two switches can be utilized to realize the invention.

By arranging the computer apparatus 10 to have the ability of to pass control command from one control port to another, the control links which now communicate with the computer apparatus can still be used for normal telephone traffic. Incoming control commands from the control ports of the switch fabric 2 can be intercepted in the computer apparatus 10. Control commands needed for normal traffic, not needed for services according to the invention, may be passed from the first control port to the second control port or vice versa. Control commands needed for services according the invention are not passed from one control port to another but interpreted and handled as required for a service according to the invention.

This situation can be applied between two switches on the same aggregation level within the network 1, but also between two switches at different levels, between switch and a RAC/RAP (Routing and Access Controller/Radio Access Point) or between a switch and a voice gateway (e.g., Voice-Over-IP gateway).

Figure 3:
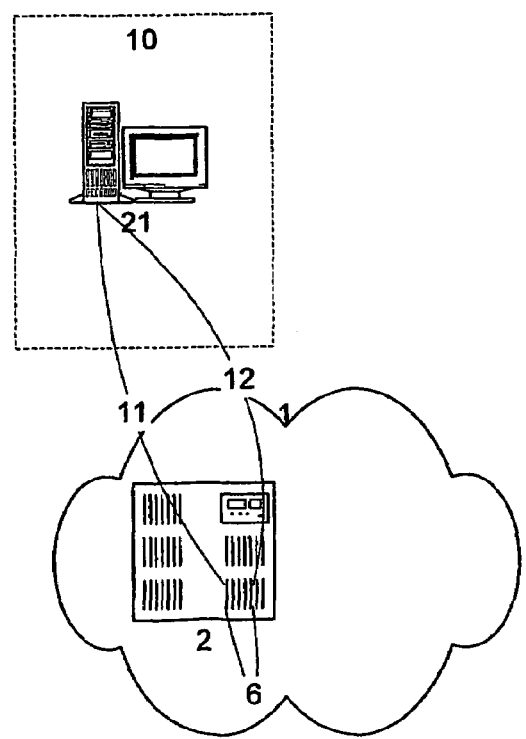
FIG. 3 shows an embodiment of the computer apparatus according to the invention.

FIG. 3 shows an embodiment of the computer apparatus 10 according to the invention.

For the computer apparatus 10, various architectures may apply. The simplest form may be that the computer apparatus 10 comprises a server 21 or a workstation acting as a server, which has communication ports that connect to the first switch fabric 2 via the control links 11 and 12. The server 21 or workstation comprising a processor, volatile memory, static memory usually in the form of a magnetic disk, is arranged to execute programs that enable the server 21 or workstation to perform as a control system. The server 21 or workstation may also be equipped with a display and input means for communicating with a user, who may develop or operate application software on this server 21 or workstation.

Figure 4:
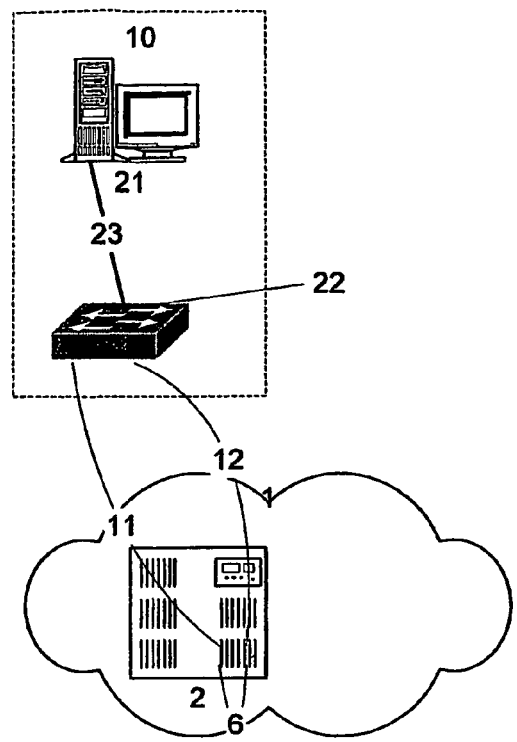
FIG. 4 shows a further embodiment of the computer apparatus according to the invention.

FIG. 4 shows a further embodiment of the computer apparatus 10 according to the invention In this embodiment, the computer apparatus 10 according to the invention is built around a signalling gateway 22 connected to the first and second control link 11 and 12. The signalling gateway 22 communicates with the first switch fabric 2 in the telecom network 1 using control commands. The server 21 has access to the functionality of the signalling gateway 22 through an API (Application Programming Interface) over connection 23, which may be an IP (Internet Protocol) connection.

Signalling gateways are commercially available products. The one used for prototyping is a "Milborne" from Telesoft Technologies.

Figure 5:
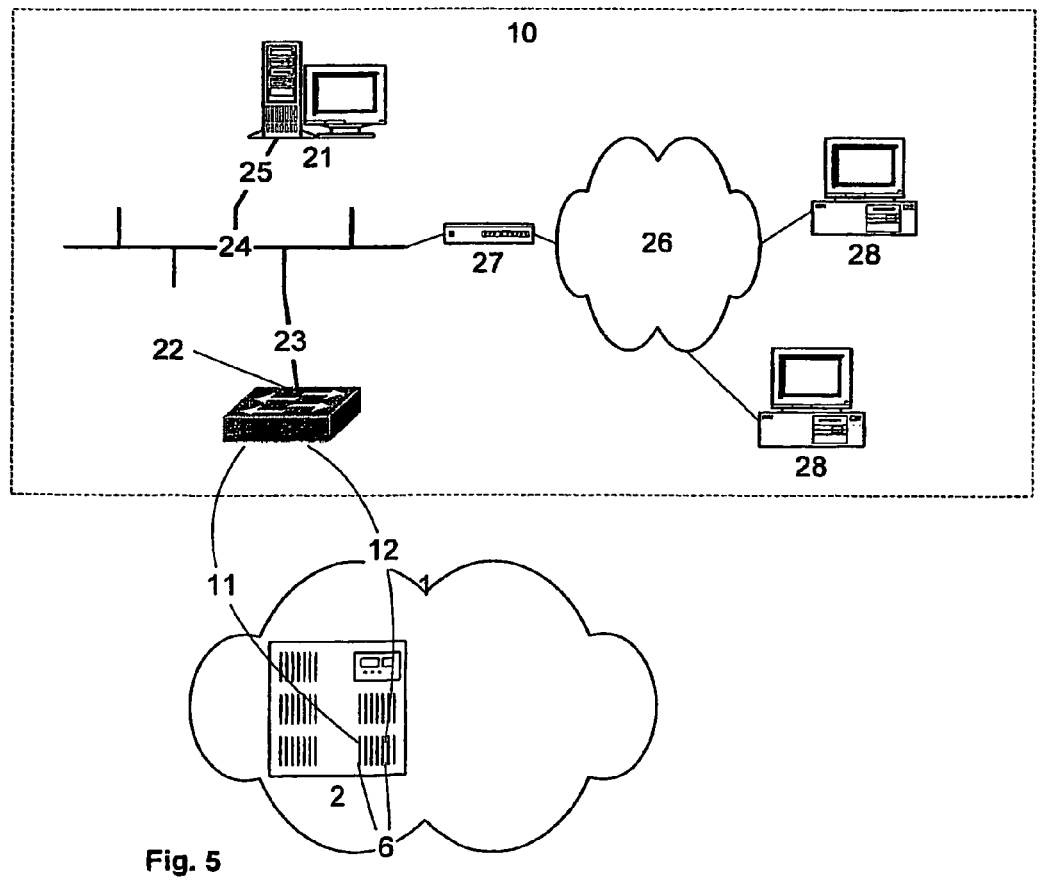
FIG. 5 shows a preferred embodiment of the computer apparatus according to the invention.

FIG. 5 shows a preferred embodiment of the computer apparatus 10 according to the invention.

In this embodiment, the server 21 and the signalling gateway 22 are connected to a private computer network 24, which may be a LAN or a WAN, via respectively a first connection 25 and a second connection 23. The private computer network 24 may then be connected, routed or bridged via a bridging means 27 which may also include a firewall to a public computer network 26, for example the Internet.

A user may gain access to the server 21 via said public and private networks 26 and 24 via bridge 27. The server 21 be arranged to provide web services which can be used, initiated or monitored from user terminals 28 like personal computers or workstations. An example of such a web-based service may be "Web-initiated call setup", whereby a telephone call can be initiated from a web/IP-based interface.

In this service, the server 21 is arranged to present a user a field on a display of his user terminal 28 where the user can type in a first and a second phone number. The user may then be presented with a button which, when clicked on, will result in an action from the server 21 sending control commands to the signalling gateway 22 which will then send appropriate commands to the first switch fabric 2 to establish or control two half calls between peripheral apparatuses 16 (not specifically shown in FIG. 5) which correspond to the first and second phone number.

In the previous described example of call conferencing, the switching of the half calls from the first conference call hardware to the second may also be controlled via a web interface by at least one of the subscribers, where the web interface communicates with the server 21 in the computer apparatus.

The invention further enables smart routing with functions like routing depending on time, day, user-settings, calling-party, called-party, etc.

Example services are:
corporate voice (routing on geographic numbers),
special number routing (084-087 numbers),
anonymous numbers,
selective reachability.

The invention can be used in various call completion scenarios in such a way that tromboning can be prevented.

Tromboning occurs when, for control purposes, a call is routed from one switch to a side path one or more further switches deep and then routed back to the switch where the side path begun.

Since the invention does not switch the voice paths, but handles control commands only, no tromboning from the ordinary telephone network will occur. Thus, the invention enables changing the destination of a call without trombones during call set up after answer.

Another feature of the invention is that as far as the computer apparatus 10 initiates half calls, it is also the computer apparatus 10 that is responsible for and in control of generating call detail records (CDR's) for billing.

Services may then be freely programmed to perform billing to users, not limited by the CDR generation rules as they are implemented in the telecom network 1.

The invention claimed is:

1. A system for controlling a telecommunications network, the system comprising:
   a first switch fabric, situated within the telecommunications network, for controlling connections in the telecommunications network, the first switch fabric including (i) a first port containing a first voice data section and a first control section, (ii) a second port containing a second voice data section and a second control section, (iii) a third port containing a third voice data section and a third control section, wherein the third voice data section is communicatively coupled to a first peripheral apparatus, (iv) a fourth port containing a fourth voice data section and a fourth control section, wherein the fourth voice data section and the is communicatively coupled to a second peripheral apparatus, and (v) a bridging circuit connecting the first voice data section and the second voice data section; and
   a computer apparatus arranged to (i) command the first control section to establish a first connection between the first voice data section and the third voice data section allowing the bridging circuit and the first peripheral apparatus to communicate, (ii) command the second control section to establish a second connection between the second voice data section and the fourth voice data section, allowing the bridging circuit and the second peripheral apparatus to communicate, thereby allowing the first peripheral apparatus to communicate with the second peripheral apparatus via the first connection, the bridging circuit and the second connection.

2. The system recited in claim 1, wherein the first voice data section and the second voice data section support multiple bridging circuits and the system comprises a plurality of bridging circuits with at least two of the bridging circuits being combined in a common trunk.

3. The system recited in claim 1 wherein the computer apparatus is further arranged to (i) send a first command to the first control section, via a first control link, for controlling the first connection, and (ii) send a second control command to the second control section, via a second control link, for controlling the second connection.

4. The system recited in claim 3 wherein the first and second control links are combined in a control network.

5. The system recited in claim 1 wherein the first switch fabric comprises a single telecommunications switch.

6. The system recited in claim 1 wherein the first switch fabric comprises first and second telecommunications switches with the first telecommunications switch having the first and third ports and the second telecommunications switch having the second and fourth ports.

7. The system recited in claim 1 wherein the computer apparatus is also arranged to receive control signals from the first switch fabric.

8. The system recited in claim 7 wherein the computer apparatus is also arranged to pass the control signals from the first and second control sections to the second and first control sections, respectively.

9. The system recited in claim 7 wherein the computer apparatus is arranged to perform a corresponding service upon receipt of one of the control signals from the first switch fabric.

10. The system recited in claim 1 wherein the computer apparatus comprises a server.

11. The system recited in claim 10 wherein the computer apparatus further comprises a signaling gateway arranged to communicate with the server, and wherein the signaling gateway comprises first and second communication ports for communicating with the first and second control sections, respectively, of the first switch fabric.

12. The system recited in claim 10 wherein the server communicates, through a computer network, with a user terminal.

13. The system recited in claim 1 wherein computer apparatus commands the first switch fabric using commands related to establishing or breaking a telecommunications connection.

14. The system recited in claim 1 wherein the computer apparatus is arranged to generate a call detail record upon establishing a connection from one of the first voice data section and the second voice data section to the third port.

15. The system recited in claim 1, wherein the computer apparatus control of the bridging circuit is based on at least one of a time of day, a day of a week, and a calling party.

16. The system recited in claim 1, wherein the computer apparatus receives a signal from a device associated with the first connection, and responsively commands the first switching fabric disconnect the first connection from the second connection and to bridge the first connection with a third connection, wherein the third connection is also supported by the first switching fabric.

17. A method for use in a system for controlling a telecommunications network, wherein the system comprises a first switch fabric, situated within the telecommunications network, for controlling connections in the telecommunications network, the first switch fabric having a first port containing a first voice data section and a first control section, a second port containing a second voice data section and a section control section, a third port containing a third voice data section and a third control section, and a fourth port containing a fourth voice data section and a fourth control section, wherein the third voice data section is communicatively coupled to a first peripheral apparatus, wherein the fourth voice data section is communicatively coupled to a second peripheral apparatus, and wherein a bridging circuit connects the first and second voice data sections, and wherein the system also comprises a computer apparatus arranged to communicate with the first and second control sections, the method comprising:
   the computer apparatus commanding the first control section to establish a first connection between the first voice data section and the third voice data section allowing the bridging circuit and the first peripheral apparatus to communicate; and the computer apparatus commanding the second control section to establish a second connection between the second voice data section and the fourth voice data section allowing the bridging circuit and the second peripheral apparatus to communicate, thereby allowing the first peripheral apparatus to communicate with the second peripheral apparatus via the first connection, the bridging circuit and the second connection.

18. The method recited in claim 17 wherein commanding the first control section to establish the first connection comprises sending a first control command to the first control section, and wherein commanding the second control section to establish the second connection comprises sending a second control command to the second control section.

19. The method recited in claim 17, wherein the computer apparatus comprises a server communicating with the first switch fabric and the server communicating, via a computer network, with a user terminal, the method further comprising:

the server sending a control command to the first switch fabric upon receipt of a user command from the user terminal.

20. The method recited in claim 19 further comprising:

the server receiving a control command from the first control section of the first switch fabric; and the server communicating a response to the user terminal upon receipt of the control command from the first switch fabric.

* * * * *